Feb. 16, 1954 H. J. DOERR 2,669,026
JOINTED MEASURING INSTRUMENT
Filed Oct. 13, 1950
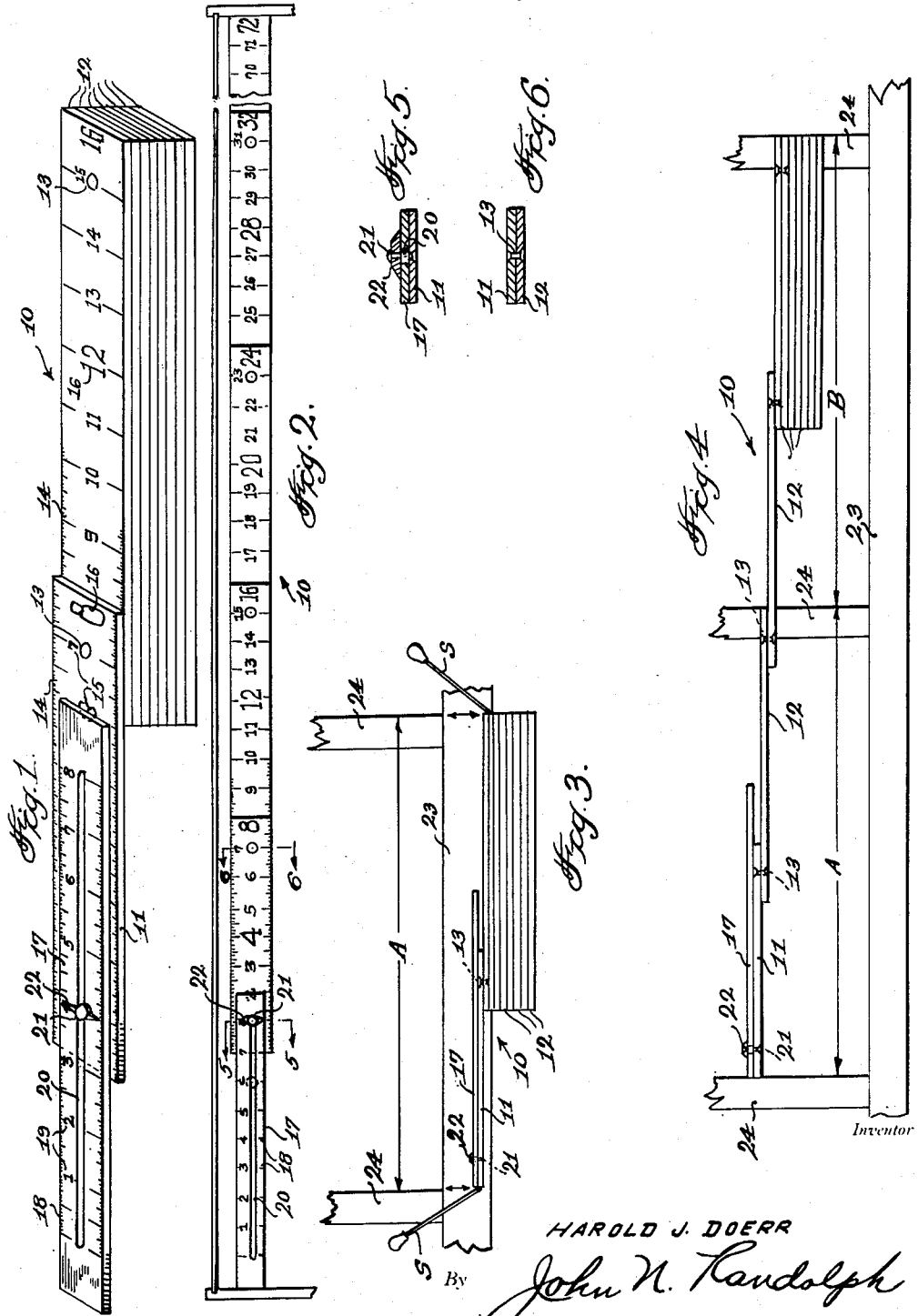
Inventor
HAROLD J. DOERR
By John N. Randolph
Attorney Patented Feb. 16, 1954

2,669,026

UNITED STATES PATENT OFFICE 2,669,026

JOINTED MEASURING INSTRUMENT

Harold J. Doerr, Lovell, Wyo.

Application October 13, 1950, Serial No. 190,033

1 Claim. (Cl. 33—161)

This invention relates to an improved construction of jointed measuring instrument of the folding rule type which is especially useful in securing inside and spaced measurements with progressive distances particularly in connection with the "modular system" of measurement now being used in the building industry.

The "modular system" utilizes a basic dimensional unit of four inches and endeavors to simplify and standardize sizes of various building materials in building units such as doors and windows and their frames.

Accordingly, it is a primary object of the present invention to provide a measuring instrument which is especially useful in connection with this four inch dimensional unit of measurement in the laying out of work such as window and door openings, partitions and floor plans et cetera.

Another object of the invention is to provide a jointed or folding measuring instrument whereby any one of several measuring lengths in accordance with the "modular system" can be readily constructed.

A further object of the invention is to provide a jointed measuring instrument having overlaps between the jointed sections of predetermined lengths in relationship to a four inch unit of measure adapting said overlaps for use in measuring fractions of a modular unit.

Still a further object of the invention is to provide a measuring instrument whereby graduations or centers can be easily transferred from the instrument to the work with exactness which will virtually eliminate parallax error.

Various other objects and advantages of the invention will hereinafter become more fully apparent from the following description of the drawing, illustrating a presently preferred embodiment thereof, and wherein:

Figure 1 is a perspective view of the measuring instrument showing one section of the slide thereof in an extended position;

Figure 2 is a plan view showing the instrument in a fully extended position for accomplishing an inside measurement;

Figure 3 is a similar view showing the instrument being employed for measuring and laying out studs, rafters, joists or building blocks;

Figure 4 shows the instrument being employed for correctly laying out or spacing a plurality of studs simultaneously, and Figures 5 and 6 are enlarged cross sectional views taken substantially along planes as indicated by the lines 5—5 and 6—6, respectively, of Figure 2.

Referring more specifically to the drawing, the jointed measuring instrument constituting the invention and as illustrated in the drawing is designated generally 10 and is shown as being composed of nine rule sections providing a rule having a basic length of six feet or eighteen four-inch units of which each rule comprises two of said units. Except for the first or top rule section 11 which is of an over-all length of eight inches, the remaining rule sections which are all identical except as to the indicia inscribed thereon, are each ten inches in length and each of said last mentioned rule sections 12 include an eight inch measuring portion and a two inch overlap portion. The top section 11 and the rule section 12 disposed directly therebeneath or next thereto are joined by a rivet or similar fastening 13 one inch from adjacent ends of said rule sections and the next rule section 12 is similarly joined to the opposite end of the aforementioned rule section 12 by a similar fastening 13 with the remaining rule sections 12 being similarly joined each with two other rule sections 12 with the exception of the bottom or last rule section 12 which, like the rule section 11 is joined only at one end.

The rule section 11 is inscribed on its upper side and along one or both of its side edges with linear graduations 14 in inches and fractions of inches and the inch graduations are numbered commencing from the left-hand end of the rule section 11 numerically commencing with "1." The upper surfaces of the rule sections 12 are similarly inscribed with linear graduations 14 and with the inch graduations thereof progressively numbered as seen at 15 from the highest number of the preceding rule section; however, the graduations 14 of each of the rule sections 12 commences two inches from its left-hand end as viewed in Figures 1 and 2 so that the portions of each rule section 12 which is overlapped by a portion of the rule section 11 or 12 located directly thereabove is not graduated and, consequently, only eight inches of the total over-all length of ten inches of each rule section 12 contains the graduations 14 and numerals 15. Each fourth numeral is enlarged or otherwise distinctively designated as a cardinal numeral as indicated at 16 so that the distance of four inches between the cardinal numerals 16 constitutes one dimensional unit of the modular system of measurement. Likewise, the two inch overlap of each rule section 12 constitutes exactly one-half of a modular unit measurement. Each of the rule sections has flat ends forming square corners from the side edges of said rule sections, as best illustrated in Figure 1, for a purpose which will hereinafter become apparent.

An extensible measuring slide is mounted on and supported by the top rule section 11 and comprises a bar 17 which is preferably ten inches in length and the upper surface of which is inscribed with linear graduations 18 in inches and fractions with the inch graduations numbered from left to right, as indicated at 19 and commencing with the numeral "1" spaced one inch from the left-hand end of the graduated portion 18. The graduations 18 commence one inch from each end of the bar 17 and said bar is provided with a slot 20 extending throughout the length of its graduated portion 18 for slidably engaging the stem of a fastening 21 which is anchored to the section 11, as best seen in Figure 5 at its "1 inch graduation" and which fastening includes a head 22 which overlies the bar 17 and has aligned tapered ends forming indexing markers, as best illustrated in Figures 1 and 2.

The rule sections 11 and 12 each having an inscribed measuring area 14 eight inches in length are equal to two dimensional units of the modular system of four inches each and may be conveniently employed for numerous measurements required in lay out work in the building industry, for example, such as the laying out the distances between studs, rafters, joists and building blocks having conventional sixteen inch centers equalling two of the rule sections. Such application and use of the instrument 10 is illustrated in Figure 3 and is accomplished by extending only the rule section 11 and positioning the slide bar 17 in a fully retracted position. The rule section 11 and the adjacent rule section 12 are then placed against a beam or other supporting structure and by employing a scribing instrument S a beam 23 can be marked at sixteen inch intervals by utilizing the remote ends of said rule sections 11 and 12 as guides for the point of the scriber. Thus, the distances between studs, joists and rafters may be accurately laid out for accurately and correctly positioning said parts as indicated at 24 in Figure 3. Similarly, by employing four of the rule sections as illustrated in Figure 4 the instrument 10 may be efficiently utilized for laying out and marking simultaneously the spaces for three studs and as the over-all length, thirty-two inches or two feet eight inches constituting four of the rule sections is also standard measurement for the width of a door, the rule or instrument 10 as shown partially extended in Figure 4 may be similarly used for laying out door openings.

Six of the rule sections equalling forty-eight inches or four feet constitutes the exact width of many building materials such as plywood, sheet rock and Masonite and likewise the centers for four studs or rafters. The rule may be similarly employed up to its full length of six feet and with intermediate measurements obtained by extending the extension bar 17.

As previously mentioned, a two inch measurement equal to one-half of a dimensional unit of four inches may be readily obtained and inscribed on a surface utilizing one end of the overlapped portion of one rule section and the adjacent end of the other rule section which is pivoted thereto and said ends of the rule surfaces will obviously function as straight edges for guiding the point of the scriber S. Likewise, a measurement of one-half a foot may be readily obtained by utilizing the left-hand end of the section 11 and the adjacent end of the adjacent rule section 12 or at any point intermediate of the ends of the extended rule by utilizing the ends of the rule sections defining the adjacent ends of adjacent overlaps of the jointed rule or instrument.

Various modifications and changes are contemplated and may obviously be resorted to, without departing from the spirit or scope of the invention as hereinafter defined by the appended claims.

I claim as my invention:

A jointed measuring instrument comprising a plurality of rule sections pivotally connected in overlapped relationship and arranged for swinging movement in parallel planes for folding or extending the sections, each of said sections having a top surface inscribed with linear graduations and indicia designating the inch graduations, the indicia bearing portions of each rule section being of a length of eight inches and the indicia inscribed on each section constituting a progressive continuation of the indicia of the next preceding section, said rule sections having cardinal indicia at four inch intervals representing a dimensional unit of measure of the modular measurement system, said rule sections having a two inch overlap at their jointed ends when in extended positions constituting one-half of a dimensional unit of measure of four inches, said rule sections being 10 inches in length, a single eight inch rule section constituting the initial section of the rule or instrument, and an extension bar slidably connected to said eight inch rule section having linear graduations on its upper surface extending to within one inch of each end of the bar and being provided with a slot disposed co-extensively with its graduated area, said eight inch rule section having a fastening spaced one inch from its free end slidably engaging the slot of said bar having a head overlying the bar constituting an indexing pointer for the graduations of the bar.

HAROLD J. DOERR.

References Cited in the file of this patent

UNITED STATES PATENTS

| Number | Name | Date |
|---|---|---|
| 738,422 | Duffy | Sept. 8, 1903 |
| 778,659 | Guth | Dec. 27, 1904 |
| 893,035 | Turner | July 14, 1908 |
| 909,819 | Prentice | Jan. 12, 1909 |
| 978,446 | Gasstrom | Dec. 13, 1910 |
| 1,379,909 | Englund | May 24, 1921 |
| 1,488,482 | Eckman | Apr. 1, 1924 |
| 1,670,025 | Denman | May 15, 1928 |
| 2,419,597 | Rushmore | Apr. 29, 1947 |

FOREIGN PATENTS

| Number | Country | Date |
|---|---|---|
| 29,297 | Germany | July 25, 1907 |
| 248,483 | Italy | Apr. 7, 1926 |
| 191,609 | Switzerland | Sept. 1, 1937 |

OTHER REFERENCES

Publications: American Builder, Sept. 1944, pages 84, 85, and 100; Engineering New Record, October 18, 1945.